United States Patent Office 3,142,962
Patented Aug. 4, 1964

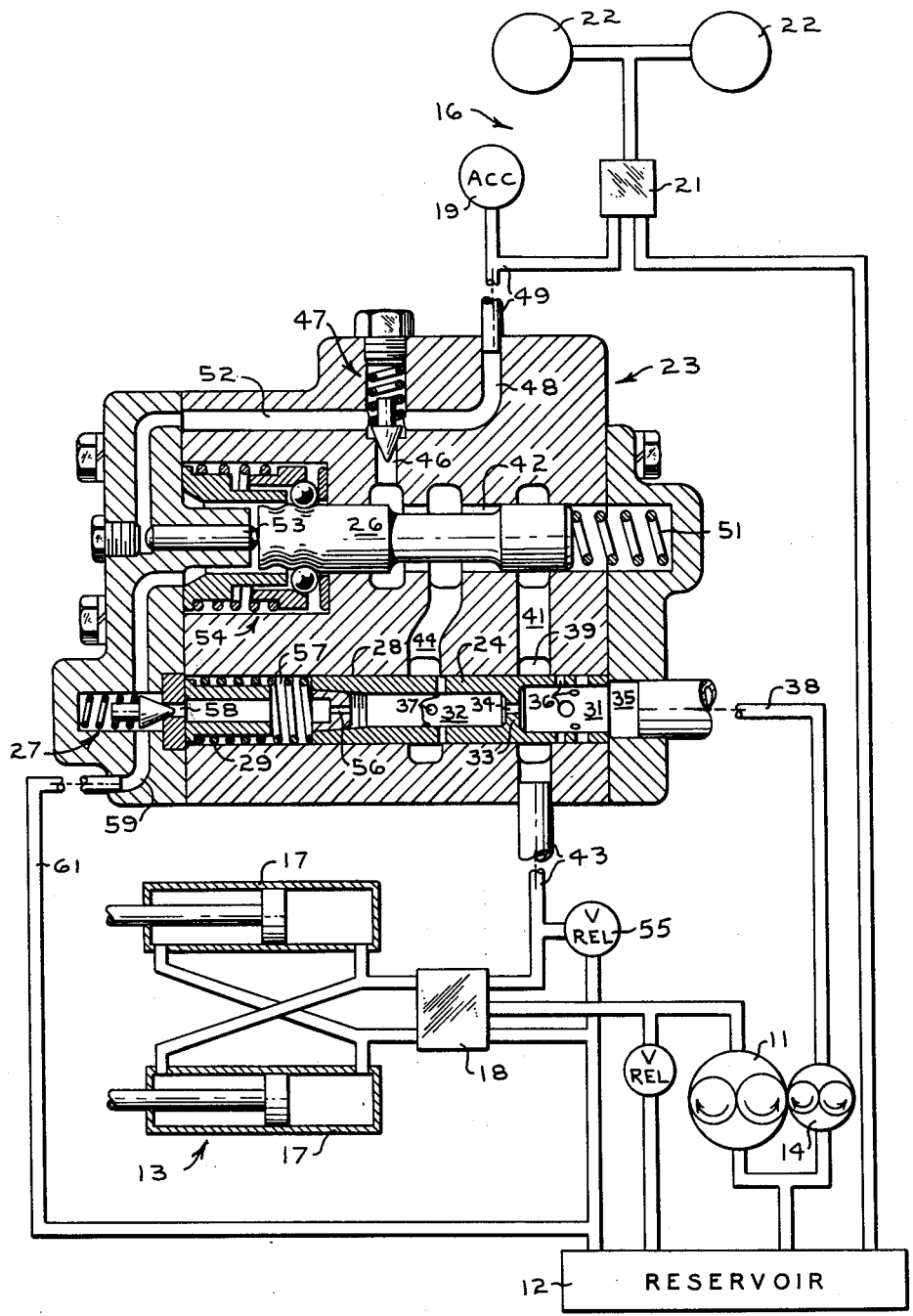

3,142,962
CONTROL VALVE
Kenneth R. Lohbauer, Joliet, Ill., assignor to Caterpillar Tractor Co., Peoria, Ill., a corporation of California
Filed Feb. 25, 1963, Ser. No. 260,437
9 Claims. (Cl. 60—51)

The present invention relates to hydraulic control valves and more praticularly to a hydraulic control valve for use in a hydraulic system including an open center system and a closed center system.

Due to the rather complex nature of modern earth moving equipment such as articulated tractors and the like, and the many functions which such equipment is designed to perform, it is not uncommon for a single hydraulic control system to include both an open center system and a distinct closed center system. An example of a closed center system which is found on many earth moving machines is a hydraulically actuated brake system. Such a system includes a plurality of hydraulically actuated brakes which are associated with an accumulator through a brake valve. The brake valve controls the communication between the brakes and the accumulator and is of the closed center type such that when the brakes are not being engaged hydraulic pressure is applied against the brake valve but not to the brakes themselves. In such a system there is very little hydraulic fluid flow. On the other hand, a valve employed to direct hydraulic fluid to steering jacks such as are found on articulated tractors, is of the open center type such that when the jacks are not being operated the valve directs fluid to a return conduit, and a constant flow of fluid passes through the valve without applying significant pressure thereto.

The demands of a closed center system, such as the closed center brake system mentioned above, require that the hydraulic circuit in conjunction therewith include a pump which provides a controlled volume of hydraulic fluid to the accumulator under all operating conditions. Since the output of an engine driven pump varies with the speed of the vehicle engine, the pump must have a capacity sufficiently great to insure that even at its minimum pumping rate the required controlled volume of fluid is available to the closed center brake system. This results in the pump operating during a great majority of the time at a volumetric output in excess of the desired controlled volume whereby some means must be provided for diverting the excess fluid. Systems as presently employed in the art generally include a relief valve or similar device by which all of the fluid in excess of the desired controlled volume is diverted back to the source from which the pump draws the working fluid. The relief valve also operates to return all of the pumped fluid to the source when the accumulator associated with the system is completely charged.

The open center system requires a rather large pump to supply the system with a constant flow of hydraulic fluid. Because of the fact that the system which this large pump services has a state where it is a relatively low pressure system (where the jacks, for instance, are not being operated) and a state wherein it is a relatively high pressure system (where the jacks are being operated) the possibility of diverting the excess flow from the pump supplying the closed center system to the open center system presents a number of problems. One of the problems presented in combining these systems is preventing the pressure in the open center system from affecting the ability of the closed center system to provide a controlled volume of fluid to the device to be operated (brakes in this case). It is, however, highly desirable that the excess flow from the smaller pump which services the closed center system be available for use by the open center system since such a combination results in a very efficient use of the horsepower required to drive the hydraulic pumps.

Accordingly, it is an object of the present invention to provide a hydraulic control system which enables a single hydraulic pump to advantageously supply two distinct hydraulic circuits wherein one of the circuits is of the closed center type while the other is of the open center type.

Further and more specific advantages and objects of the present invention will be made apparent by the following description wherein a preferred form of the invention is described with reference to the accompanying drawing.

The drawing is a cross sectional elevation of the control valve of the invention shown in combination with a closed center brake system and open center steering system, both of which are illustrated schematically.

The invention is described herein in its application to an articulated tractor wherein steering is accomplished by fluid actuated jacks disposed between articulated sections of the tractor and the fluid to the jacks is under control of an open center valve while the brakes of the tractor are controlled by a closed center valve system. Other uses for the invention will, however, become apparent from the ensuing description and it is thus to be understood that the invention is not limited to use with steering systems and brake systems exclusively.

Referring now to the drawing, a large pump 11 is adapted to draw fluid from a reservoir or tank 12 for supply to an open center steering circuit 13, while a small pump 14 is adapted to draw fluid from tank 12 for supply to a closed center brake circuit 16 as well as the open center steering circuit 13. The steering circuit 13 includes steering jacks 17, open center steering valve 18, pumps 11 and 14 and tank 12. The output of pumps 11 and 14 is continuously circulated through the open center steering valve 18 and back to the tank 12. The brake system 16 comprises an accumulator 19, a closed center brake valve 21 and hydraulically actuated vehicle brakes 22.

A valve group 23 is hydraulically disposed between pump 14 and brake system 16 and operates to divert a portion of the fluid from pump 14 (that in excess of the controlled volume necessary for the brake system) to the open center system 13. Valve group 23 includes a control spool 24, an accumulator charging valve 26, and a pilot valve 27. Control spool 24 is slidably disposed in a bore 28 and spring biased toward the right (as shown) by means of a biasing spring 29. The spool is divided into a first chamber 31 and a second chamber 32 by means of a dividing wall 33 which has a restricted orifice 34 therein which provides communication between the two chambers. The portion of spool 24 which defines chamber 31 has a plurality of radial orifices therein at staggered longitudinal positions. A similar set of orifices, also at staggered longitudinal positions around the spool, are formed in that portion of the spool 24 which defines chamber 32.

Fluid drawn from reservoir 12 through pump 14 is delivered by way of conduit 38 to an inlet port 35 which is coaxial with bore 28 and in direct communication with chamber 31. The volume of fluid pumped by pump 14 is generally greater than the volume of fluid which can pass through orifice 34 causing a pressure drop to exist across orifice 34 such that a counteracting force to spring 29 is established, causing spool 24 to shift to the left. Orifice 34 is designed to pass a controlled volume of fluid (i.e. three g.p.m.) for the closed center brake system 16. When spool 24 shifts to the left some of orifices 36 become aligned with a radially enlarged portion 39 of bore 28. Enlarged portion 39 communicates with a conduit 43 which leads to steering valve 18. Thus, the volume of fluid delivered to chamber 31 in excess of the predetermined controlled volume is diverted through a conduit 43 to the open center system 13. By proper selection of a spring constant for spring 57 and arrangement of orifices 36 the volume of fluid that passes through orifice 34 can be any desired quantity (within limits) and maintained relatively constant at that selected volume. If the volumetric output of the pump 14 increases, the pressure drop across orifice 34 will increase and spool 24 will move leftwardly. Leftward movement of the spool exposes more of orifices 36 to conduit 43 so that the added output of the pump is directed to system 13 and not to the brake system. A decrease in the output of the pump results in a rightwardly movement of the spool which reduces the number of orifices communicating with conduit 43. Thus, the decreased pump output causes a decrease of fluid from pump 14 to system 13 but not a decrease to system 16.

The constant flow of fluid through orifice 34 passes through orifices 37 in chamber 32 to a port 44 which communicates with bore 42. When the spool 26 is in the position shown (accumulator charging position) communication exists between port 44 and a passage 46 through bore 42. Passage 46 leads through a check valve 47 to a passage 48 which communicates with a conduit 49 which in turn is in communication with accumulator 19 and brake valve 21. Thus, while spool 26 is in the accumulator charging position the controlled volume of fluid is supplied to accumulator 19 and the volume of fluid pumped by pump 14 above that required for the needs of accumulator 19 is diverted to an open center system 13 to supplement the fluid furnished thereto by pump 11.

When the pressure in accumulator 19 reaches a preset maximum (e.g. 1500 p.s.i.) spool 26 will shift to the right (as shown) against the counteracting force of spring 51 and detent mechanism 54. The pressure in accumulator 19 is reflected in passage 48 and therefore in connecting passage 52. Passage 52 leads to a slidably disposed piston 53 which is coaxial with spool 26 and in abutting relation therewith. Thus, by proper choice of the spring constant of spring 51, spool 26 will be shifted to the right when the maximum desired pressure in accumulator 19 acts against slug 53. The detent mechanism 54 operates to restrict spool 26 to one of two possible positions in a manner more fully described in assignee's copending application Serial No. 206,420, filed June 29, 1962, for "Accumulator Charging Valve." When spool 26 is in its rightward position communication between port 44 and port 46 through bore 42 is blocked while communication between a port 41 and port 44 through bore 42 is established. Under these conditions, system 16 does not require any of the output of pump 14, and the communication between ports 44 and 41 enables the controlled volume of fluid to be directed to system 13, via conduit 43 which communicated with port 41. When the pressure in accumulator 19 drops below a minimum accumulator pressure level (e.g. 1200 p.s.i.) spring 51 will be effective to reposition spool 26 to the leftward position (as shown) and once again form communication between pump 14 and accumulator 19 through the control group 23.

The position of orifices 36 relative to conduit 43 maintains the flow through orifice 34 constant when the pressure in the conduit 43 is less than the pressure in port 44 (as when the jacks are not being actuated). When the pressure in conduit 43 is greater than that in port 44, however (as when the jacks are being actuated), it is this pressure difference which determines the flow through the orifice 34. If the pressure drop is greater than that normally maintained across orifice 34, the volume of fluid flowing into chamber 32 will exceed the desired controlled volume. To prevent an excessive pressure drop from occurring across orifice 34 under these conditions, orifices 37 are longitudinally disposed to become blocked as the pressure difference between conduit 43 and port 44 increases. This takes place automatically since the increased pressure drop shifts spool 24 leftwardly and thus urges orifices 37 to non-communicating positions. As orifices 37 become blocked the pressure in chamber 32 increases so as to reduce the pressure drop across orifice 34 and maintain the desired volume of fluid flow. Thus, orifices 37 operate to throttle the flow of fluid through chamber 32 to port 44 when system 13 is in operation. During operation under these conditions the volume of fluid from pump 14 in excess of the desired controlled volume is delivered, as before, through orifices 36 to conduit 43 leading to open center system 13. Thus, pump 14 operates to charge up accumulator 19 and at the same time aid pump 11 in operating jacks 17.

Should the spool 26 stick in a position to block communication of port 44 with either of ports 41 or 46 the pressure in chambers 31 and 32 will equalize and spool 24 will be urged by spring 29 to the position shown. This interrupts communication between pump 14 and the steering circuit 13. Since the relief valve indicated at 55 and associated with pump 14 communicates with conduit 43 on the downstream side of spool 24, rightward movement of the spool isolates the upstream portion of the circuit comprising pump 14, conduit 38, port 35 and chamber 31 from the relief valve 55. It is therefore desirable that means be provided to relieve pressure in that portion of the circuit in the event of the aforementioned malfunction of the valve. For this purpose a spring biased pilot valve 27 controls communication between chamber 32 and reservoir 12 by way of an orifice 56, spring chamber 57, orifice 58, port 59, and a conduit 61. When the pressure in the upstream portion of the circuit and consequently the pressure in chambers 32 and 57 exceeds slightly the pressure setting of relief valve 55, valve 27 will open to vent the chamber 57 to reservoir 12 as described. This permits spool 24 to shift leftward under the influence of pressure in chamber 31 and communicate the output of pump 14 with steering circuit 13 through orifices 36.

By the arrangement of the present invention, an efficient use of pumping horsepower is achieved and at no expense in safety since the entire output of the pump 14 is always available to the brake system if the need arises.

I claim:

1. A control valve for use in combination with a hydraulic system including a source of working fluid, a pump disposed to deliver fluid from the source, an open center system and a closed center system with an accumulator, comprising in combination;

first valve means in communication with the pump, the open center system and the closed center system;

said valve means having a restrictive orifice hydraulically disposed between the pump and closed center system whereby a pressure drop is developed when the volumetric output of the pump is greater than the fluid flow through the orifice; and means responsive to the pressure drop across the orifice to communicate the pump with the open center system through said valve means wherein the physical area of communication is a direct function of the magnitude of the pressure drop across the orifice whereby the volume of fluid flow through the orifice is maintained relatively constant.

2. The control valve of claim 1 further including:

a second valve means hydraulically disposed between said first valve means and the closed center system, said second valve having one position in which fluid flow from the orifice to the closed center system is unrestricted thereby, and a second position in which the fluid flow is blocked from the closed center system and diverted to an output port in said second valve means; and means communicating the output port of said second valve means with the open center system.

3. The control valve of claim 2 further comprising: valve positioning means associated with said second valve means and in hydraulic communication with the accumulator of the closed center system, said means operative in response to the pressure in the accumulator being above a preset maximum to urge said second valve means to its second position and operative when the pressure in the accumulator drops below a preset minimum to urge said second valve means to its one position.

4. The control valve of claim 3 further comprising: safety pilot valve means in communication with said first valve means on the downstream side of the orifice in said valve means, said pilot valve means also in communication with the fluid source and responsive to improper shifting of said second valve whereby communication between said orifice and the closed center system and said output port is blocked to communicate the downstream side of the restrictive orifice with the fluid source and thereby permit the first valve to shift to a position communicating the pump with the open center system.

5. A control valve for use in combination with a hydraulic system including a source of working fluid, a first hydraulic pump disposed to draw fluid from the source, an open center hydraulic system disposed to receive the output of the first pump, a second pump, a closed center system with an accumulator, comprising in combination:
a valve body;
a first valve spool slidably disposed in said valve body, said valve spool including a first chamber, a second chamber and a restrictive orifice therebetween;
means communicating the second pump to the first chamber whereby fluid passes through the orifice into the second chamber at a desired rate;
means communicating the second chamber with the closed center system; and
means communicating the first chamber with the open center system when the flow into the first chamber from the second pump exceeds the flow through the orifice, said means responsive to increases in flow into the first chamber over flow through the orifice to increase the amount of communication between the first chamber and the open center system and thereby maintain the flow through the orifice relatively constant.

6. The control valve of claim 5 further comprising: means responsive to a failure of maximum communication between the first chamber and the open center system to prevent flow through the orifice at a rate greater than desired, to reduce the amount of communication between the second chamber and the closed center system.

7. A control valve for use in combination with a hydraulic system including a pump, closed center system and an open center system comprising in combination:
first valve means in communication with the pump, the closed center system and the open center system, said valve including a restrictive orifice hydraulically disposed between the pump and closed center system;
means responsive to a pressure drop across the orifice, due to a greater flow to the valve means than passes through the orifice, to communicate the pump and open center system through the valve means wherein the amount of communication increases with increased pressure drop across the orifice, whereby the flow through the orifice is maintained relatively constant; and
means responsive to a pressure drop across the orifice when maximum communication exists between the pump and open center system through said valve means to decrease the amount of communication between the valve means and closed center system and thereby equalize the pressure on either side of the orifice.

8. A hydraulic system comprising in combination:
a source of working fluid;
a first pump disposed to draw fluid from said source;
an open center hydraulic system;
means communicating said first pump with said open center system whereby working fluid is supplied thereto;
a second pump disposed to draw fluid from said source;
valve means hydraulically communicating said second pump with said closed center system;
means communicating said valve means with said open center system;
said valve means operable when said closed center system requires pressure fluid from said source to limit the flow of fluid from said second pump to said closed center system to a desired controlled volume and direct the amount in excess thereof to said open center system.

9. The system of claim 8 further described by said valve means being operable when said closed center system does not require pressure fluid from said source to direct all of the fluid from said second pump to said open center system.

References Cited in the file of this patent

UNITED STATES PATENTS

| | | |
|---|---|---|
| 2,643,516 | Carlson | June 30, 1953 |
| 2,674,092 | Gardiner | Apr. 6, 1954 |
| 2,793,498 | Banker | May 28, 1957 |